April 26, 1960 W. C. GRESHAM ET AL Re. 24,818
AUTOMATIC WELL DRILLING APPARATUS
Original Filed May 14, 1956 3 Sheets-Sheet 1
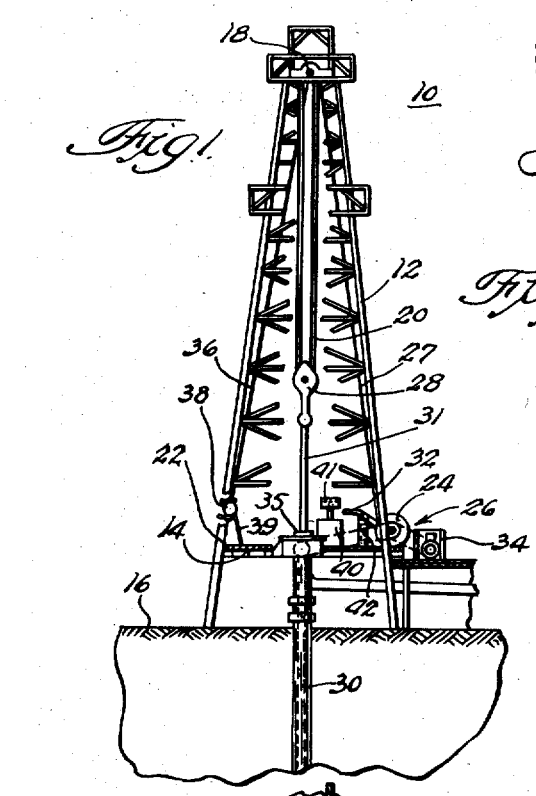
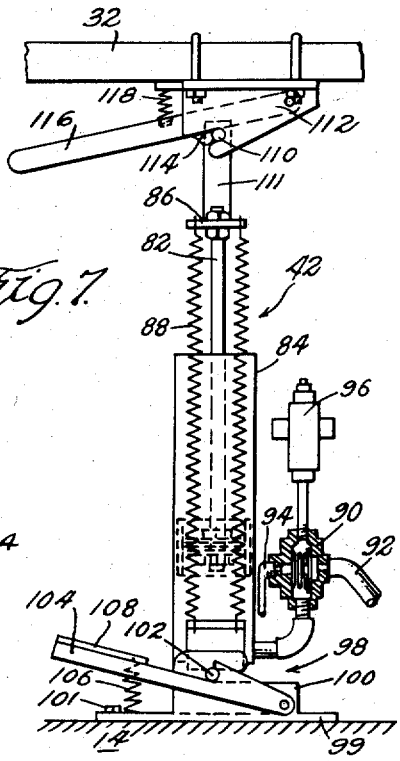
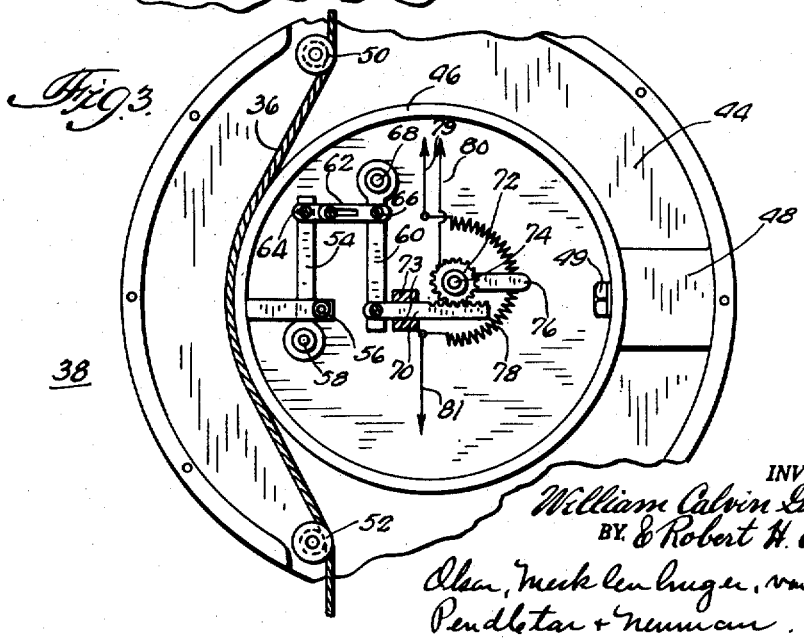
INVENTORS.
William Calvin Gresham.
BY. & Robert H. Ashby.
Olson, Meuklenburger, von Holdt,
Pendleton + Newman.
Attys.

AUTOMATIC WELL DRILLING APPARATUS

Original Filed May 14, 1956 3 Sheets-Sheet 2

INVENTORS.
William Calvin Gresham
BY & Robert H. Ashby.
Olson, Mecklenburger, von Holst
Pendleton & Newman.
Attys.

AUTOMATIC WELL DRILLING APPARATUS

Original Filed May 14, 1956 3 Sheets-Sheet 3

INVENTORS.
William Calvin Gresham
BY & Robert H. Ashby.
Alva, Mucklenburger, and Holst,
Pendleton & Neuman
ATTYS.

United States Patent Office

Re. 24,818

Reissued Apr. 26, 1960

24,818

AUTOMATIC WELL DRILLING APPARATUS

William Calvin Gresham and Robert H. Ashby, Oklahoma City, Okla., assignors to Mud Control Laboratories, Inc., Oklahoma City, Okla., a corporation of Delaware Original No. 2,842,339, dated July 8, 1958, Serial No. 584,547, May 14, 1956. Application for reissue April 15, 1959, Serial No. 806,735

21 Claims. (Cl. 254—173)

Matter enclosed in heavy brackets [ ] appears in the original patent but forms no part of this reissue specification; matter printed in italics indicates the additions made by reissue.

This invention relates to automatic well drilling apparatus and more particularly to apparatus for continuously controlling the pressure of a well drilling tool or bit on the well bottom by controlling the tension in a supporting member.

It is the present practice in the oil fields to support a long string of drilling pipe with a rotating drilling bit at the bottom thereof in such a manner that only a predetermined pressure is applied to the bit against the well bottom. It has been found that drilling tools function best at a known optimum drilling pressure and it is desirable to maintain the actual pressure as close as possible to this optimum. The remaining weight of the drill pipe is supported from above through a flexible cable which is secured to a rotatably mounted reel, a part of the cooperating apparatus generally termed a "draw works." The rotatably mounted reel has a brake which is manually controlled and an operator continuously manipulates the brake handle while observing an indicator, whereby he maintains a predetermined tension in the supporting cable which, in turn, produces a predetermined drilling pressure. As will be manifest, as the tool drills deeper the drill pipe begins to hang freely and the tension in the cable increases. Thus, the operator must release a length of cable sufficient to produce the desired pressure against the well bottom. Such control requires continuous supervision by a skilled operator.

It has been proposed heretofore to provide an automatic means for feeding cable gradually and continuously as the well bottom is drilled off. Such a system included a friction brake and means to permit gradual slippage of the friction brake. Such a system has proven generally unsatisfactory and the principal reasons appear to be, first, a slipping member produces excess wear and requires continuous maintenance, and the indicator does not give a true representation of the conditions because of the transient effects of a continuously feeding cable.

It is, therefore, one obect of this invention to provide improved well drilling apparatus which will continuously control drilling pressure while permitting the accurate measurement thereof.

It is another object of this invention to provide improved well drill apparatus requiring minimum supervision.

It is another object of this invention to provide improved well drilling apparatus which will accurately control the tool pressure on the well bottom within predetermined limits.

It is still a further object of this invention to provide automatic well drilling apparatus which will simulate the control provided by a continuously attentive supervisor.

It is another object of this invention to provide improved automatic well drilling apparatus which will have minimum wear by eliminating any frictionally engaged or slipping parts.

It is still another object of this invention to provide improved drilling apparatus that, in the event of any failure in the system, will assume a quiescent state, preventing further operation or damage to any associated equipment and to give an appropriate indication of the condition.

Further and additional objects of this invention will become manifest from this description, the accompanying drawings and the appended claims.

In one form of this invention, means are provided for continuously measuring the tension in a flexible support member for a drilling tool and intermittently actuating the holding means for releasing said supporting member to reduce the tension therein. More particularly, an electronic system is provided to sense the tension continuously, indicate both the total tension and the deviation in said tension from a predetermined optimum, and actuate a fluid operated device in accordance with said deviation to feed predetermined lengths of supporting member to reduce said tension during fixed spaced time intervals.

For a more complete understanding of this invention reference will now be made to the accompanying drawings wherein:

Figure 1 is a schematic illustration of a well drilling rig;

Fig. 3 is a diagrammatic illustration of one tension sensing device;

Fig. 7 is an elevational view of the actuating mechanism and control device illustrated in perspective in Fig. 4.

Figures 2, 4:
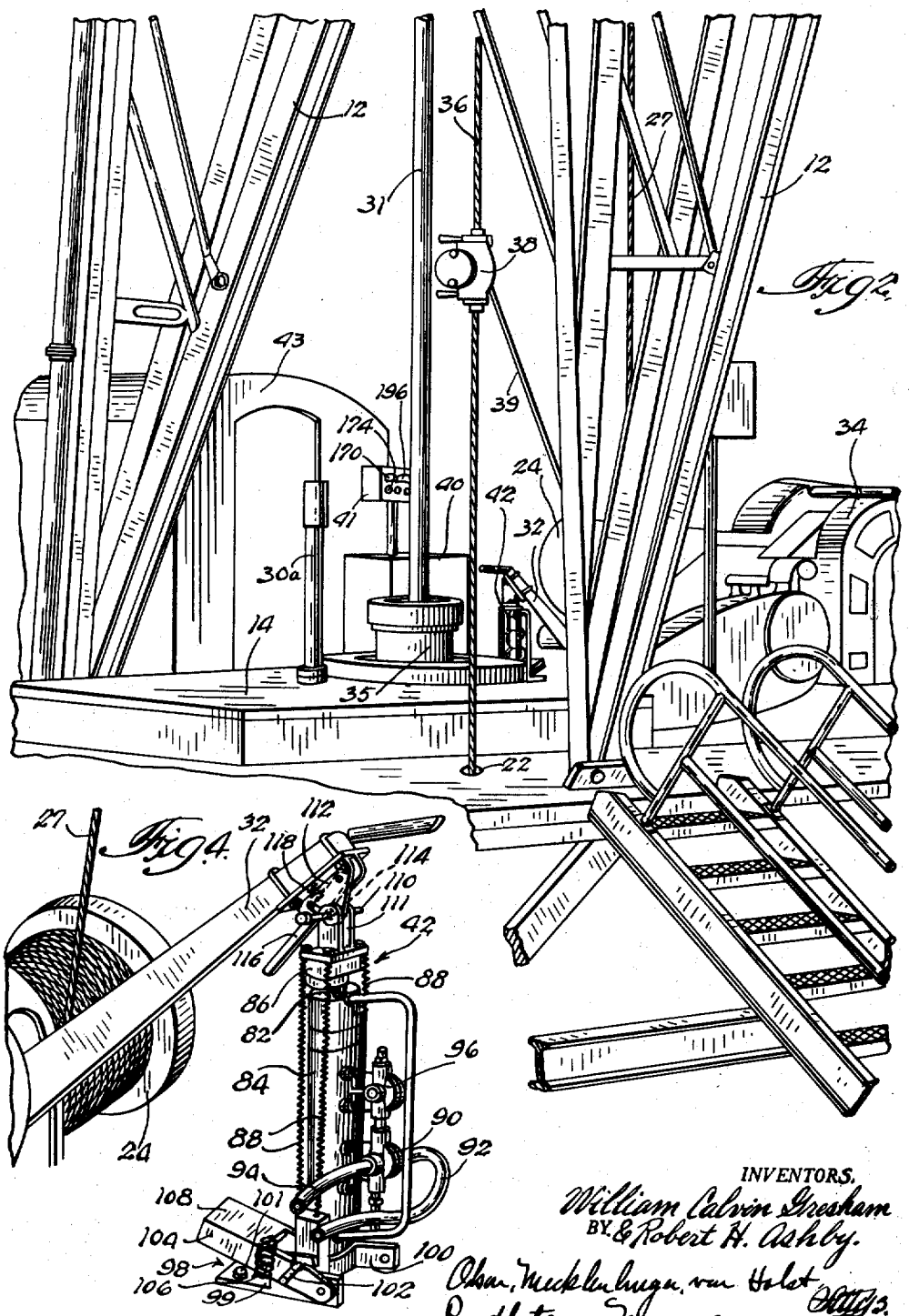
Fig. 2 is a partial illustration of the drilling table portion of the rig of Fig. 1.
Fig. 4 is a perspective view of the fluid operated control device for feeding flexible cable.

Referring now to the drawings and more particularly to Figs. 1 and 2, a drilling rig 10 is illustrated comprising a derrick 12 having a drilling table 14 horizontally disposed above the ground level 16. A crown block 18 is fixed near the top of the derrick, and a flexible cable 20 extends between the crown block 18 and a travelling block 28. One end of the cable 20, the dead line 36, is fixed to the drilling table 14 at the position 22. From the dead line 36, the cable 20 forms several loops between the crown block 18 and the travelling block 28 to produce a mechanical advantage in the well understood manner.

The plurality of cable courses pass between independently rotatable sheaves on the travelling block 28 and the crown block 18 to lift the travelling block and raise a string of drill pipe 30 which extends downwardly therefrom. The *other* end of cable 20 comprises the fast line 27 which is fixed to the reel 24 of a draw works 26. Thus, by operating reel 24, the travelling block may be raised or lowered to raise or lower the drill bit.

In typical drilling operations the weight of the string of drill pipe 30 will vary between about 20,000 and 400,000 pounds depending upon the depth of the hole. As the bottom of the hole is drilled off it will be understood that the pipe 30 settles into the hole and that drilling pressure thus diminishes unless the travelling block 28 is lowered to follow the drill pipe 30. To permit this, increments of the fast line 27 of cable 20 must be released from reel 24 in a controlled manner to maintain an optimum pressure on the well bottom. Various drilling bits are designed for operation at predetermined optimum drilling pressures but, as a general rule, the optimum pressure is within a range of 30,000 to 50,000 pounds and, thus, any weight of drill pipe in excess of this must be supported by the cable 20 through the travelling block 28.

An operator will know the number of lengths of pipe 30 which are in the hole and will thus know the total weight of the pipe string when the drilling tool is off of the bottom. Thus, if means are provided to continuously indicate the tension in cable 20 a difference between this tension and the total weight will indicate the drilling pressure. If an operator then continuously monitors the tension in the cable 20 and operates a brake handle 32 to maintain the tension within predetermined limits, it is possible to control the drilling pressure.

An engine 34 comprises a part of the draw works 26 and is provided adjacent the drilling table to drive the reel 24 and withdraw the string of pipe 30, if this is desired, at any time, for the replacement of tools, completion of the well, and the like. Also the engine 34 is utilized to raise additional lengths of drill pipe into position above the existing lengths of pipe for continued drilling. The drill pipe is rotated by a rotatably driven bushing 35 which engages an uppermost extension 31 of the pipe which has a square cross section and is generally termed a "kelly."

In accordance with this invention, apparatus is provided for continuously monitoring the tension in the dead line 36 by a transducer 38. The transducer 38 energizes a control circuit disposed in housing 40 and in accordance with the operation of the control circuit a pneumatic actuator 42 automatically releases reel 24 through brake handle 32 for predetermined fixed time intervals, after which the brake is positively locked for a succeeding predetermined time interval. As shown in Fig. 2, a spare length of drill pipe 30a is stored adjacent to the bushing 35, and the circuit housing 40, including an indicator and control panel 41, is mounted adjacent a conventional work shed 43. A cable 39 extends from the transducer 38 to the control housing 40.

The transducer 38 is diagrammatically illustrated in Fig. 3. A housing 44, illustrated with the cover portion removed, has a proving ring 46 mounted therein on a fixed block 48 by a bolt 49. The proving ring 46 has a modicum of resiliency whereby it may be partially distorted when pressure is applied thereto. The dead line 36 passes over a pair of rollers 50 and 52 and around the periphery of the ring 46. Thus, tension in the dead line 36 will produce diametric distortion of the ring 46. In a typical drilling operation six plies of cable might be attached to the travelling block 28, and thus with a total string weight of 340,000 pounds, the tension in cable 36 required to provide a 40,000 pound drilling pressure would be 50,000 pounds. Thus, proving ring 46 would be a reasonably rigid device having only slight distortion.

The proving ring 46 is connected to a lever arm 54 through a pivotal connection 56. Lever arm 54 is rotatably mounted in housing 44 on pin 58. Arm 54, in turn, drives a pivotally mounted arm 60 through an adjustable elongate link 62 pivotally mounted on arms 54 and 60 by machine screws 64 and 66. Arm 60 is pivotally mounted for movement about pin 68 and has at its free end a longitudinally movable rack 70 mounted in guide means 73. Longitudinal movement of rack 70 rotates pinion 72 about axle 74, carrying with it potentiometer wiper 76 which engages a point on potentiometer resistance element 78 to produce an output in conductor 80. The ends of resistance element are connected through conductors 79 and 81 to a D.C. power supply, as will be more clearly described hereinafter. It will be clear that the illustration is highly schematic to better illustrate the principles involved and the operation of the apparatus. In practice the potentiometer including wiper 76 and resistance element 78 are completely enclosed.

It will appear that increased tension in cable 36 will partially collapse ring 46, producing clockwise movement of arm 54. This will produce amplified movement of link 62 which will, in turn, rotate arm 60 in a counterclockwise direction, moving rack 70 to the right, producing counterclockwise rotation of the potentiometer wiper 76. As should be understood, for each tension in cable 36, there is a unique position of wiper 76 which may be sensed by the electronic apparatus described hereinafter to control a mechanical device for continuously adjusting the tension in cable 36 and maintaining it within predetermined limits, thus maintaining optimum drilling pressure. When the tension in cable 36 increases above a predetermined magnitude the electronic apparatus in housing 40 actuates the pneumatic brake release device 42 which is most clearly shown in Fig. 4.

As shown in Figs. 4 and 7, the fast line 27 is wound about the reel 24 forming a part of the draw works 26. A brake maintains the reel 24 normally locked against rotation and a brake handle 32, when raised, releases the brake, permitting withdrawal of the cable 27 from the reel 24. The brake handle actuator 42 comprises a pneumatic cylinder 84 having an internally slidable piston connected to an upper bracket 86 through piston rod 82. The upper bracket is normally maintained in close proximity to the upper end of cylinder 84 by a plurality of coil springs 88.

An inlet valve 90 of the differential or quick release type is disposed on the cylinder 84 and communicates with the lower cavity thereof to apply pressure for extending the piston under predetermined conditions. A flexible hose 92 is connected to the valve 90 through a control valve in the equipment housing 40 from a source of substantial air pressure. The hose 94 may be a return air line, although, in the instant embodiment, this line discharged air into space whenever the air pressure within the cylinder 84 exceeds that within the first hose 92. This differential type of valve operation provides especially quick action and enables manual override of the automatic controller 42, whereby an operator may depress the handle 32, increasing the pressure within cylinder 84 and consequently actuating the valve 90. A return valve 96 communicating with the upper cavity of cylinder 84 is also provided if positive return of the cylinder is desired, but this valve is not employed in the instant embodiment.

The contol mechanism 42 is mounted on the drilling table through a quickly detachable device 98. The device 98 comprises a bracket 99 mounted to the table 14 by a plurality of bolts 101 and having a pair of upstanding slotted faces 100 which receive a pin 102 secured to the bottom portion of cylinder 84. The pin is held in the slotted faces 100 by a pivotally mounted clamp 104. The pivotally mounted clamp 104 is normally urged upwardly by a coil spring 106 whereby the cylinder 84 is rotatable about pin 102 between the illustrated vertical position and a substantially horizontal position. Also, the entire control device 42 may be removed by depressing the pedal portion 108 of clamp 104 and removing the pin 102 from the slotted faces 100.

The upper plate 86 is provided with a pin 110 mounted in the upper portion of a clevis 111 and engageable by a bracket 112 which is fixed to handle 32. The attachment of bracket 112 to pin 110 is similar to that provided by the lower clamp, whereby the control device may be quickly removed from the brake handle. The pin 112 enters an elongate slot 114 formed in bracket 112 and is maintained in the slot by a clamping handle 116 pivotally mounted on bracket 112 and urged downwardly by coil spring 118. Thus, when it is necessary to manually operate brake handle 32, as, for example, when an additional pipe length is being placed in the string, the handle 116 will be pressed toward the brake handle 32 and the entire mechanism 42 pivoted about pin 102 to lie substantially flat on the drilling table 14, out of the way of the operator.

Figures 5, 6:
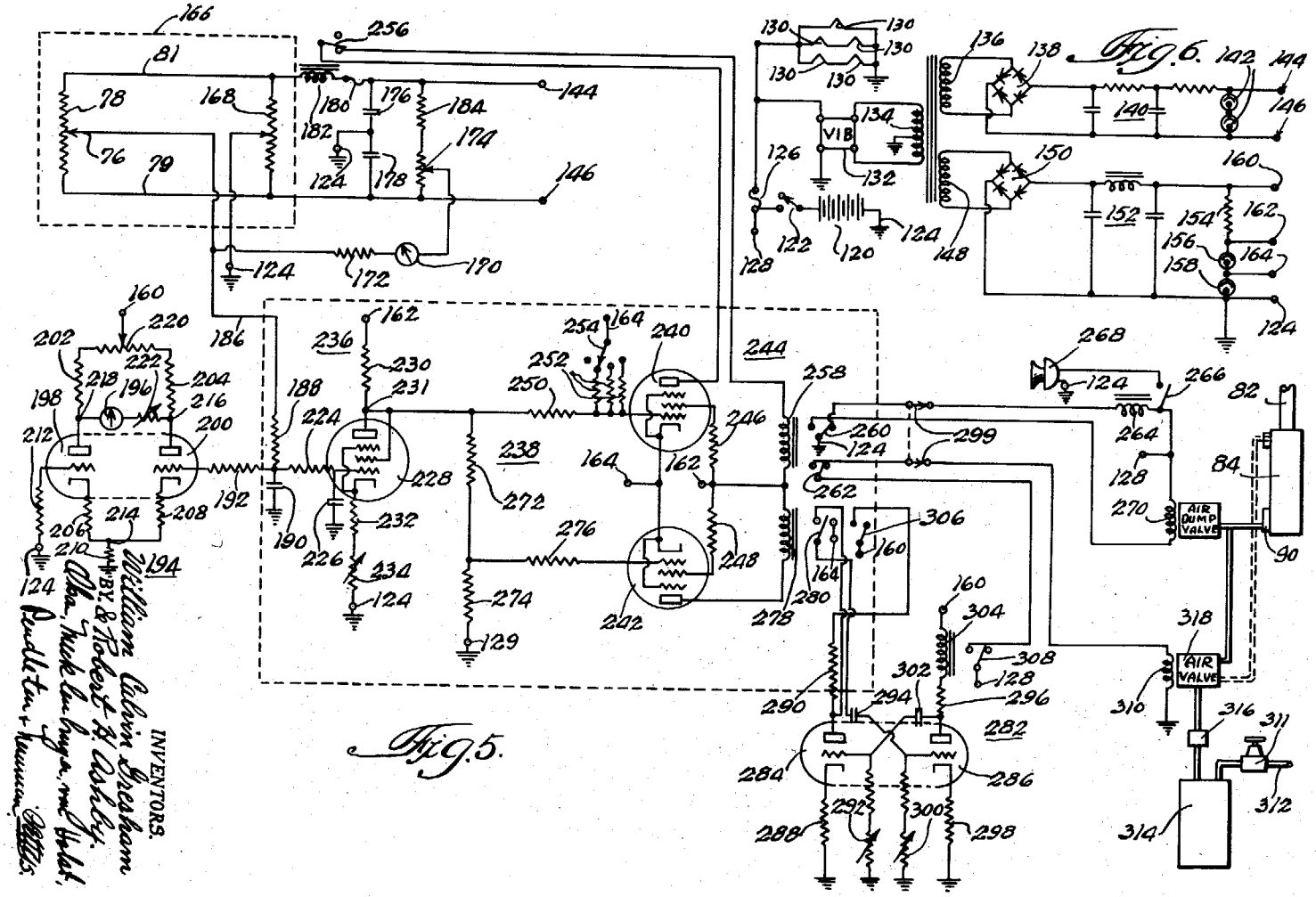
Fig. 5 is a schematic diagram of the control circuits forming one embodiment of this invention.
Fig. 6 is a chematic diagram of one power supply adapted for use with the circuit of Fig. 5.

The electronic components which utilize the information provided by the sensing device 38 to produce control of the automatic operating mechanism 42 are illustrated in Fig. 5 and the power supply for these components is illustrated in Fig. 6. Referring to Fig. 6, a power supply is illustrated for energization from a conventional storage battery 120. The battery 120 may, for example, be a twelve volt supply associated with the engine connected to drive bushing 35. Application of power to the circuit is controlled by a main switch 122 in the positive conductor with a negative terminal connected to a ground 124. A fuse 126 is connected in series with all circuits hereinafter described with the exception of the alarm circuit which is connected to terminal 128. The output of battery 120 is applied to the series parallel combination of filaments 130 of the various vacuum tubes forming a part of the circuit to be described and is applied to a vibrator 132 of any conventional type. As is well understood, the output of vibrator 132 will be an A.C. signal which is applied to the center-tapped primary winding 134 of a power transformer. The power transformer has a first secondary winding 136 which is connected to a bridge type rectifier 138, the output of which is applied through a filter network 140 to a pair of gas-filled regulating tubes 142 to provide a 300 volt regulated D.C. supply between terminals 144 and 146. A second secondary winding 148 of the power transformer is applied to another bridge rectifier network 150, the D.C. output of which is applied to a filter network 152. The output of filter 152 is applied across a series connection of resistor 154 and gas-filled regulating tubes 156 and 158. Thus, by the proper selection of resistor 154 and tubes 156 and 158 a voltage at terminal 160 of 250 volts, at terminal 162 of 180 volts, and at the terminal 164 of 75 volts relative to ground terminal 124 may be provided. The terminals 124, 144, 146, 160, 162, 164 and 128 of the power supply are connected in the control circuit of Fig. 5 at the various places indicated whereby the necessary potentials for normal operation of the circuit are provided.

Referring now to the control circuit of Fig. 5 the sensing potentiometer comprising resistance element 78 and wiper 76 is illustrated in a bridge circuit 166. A similar potentiometer 168 forms the other two legs of the bridge and the bridge output is taken between ground terminal 124 and wiper 76. Potentiometer 168 is initially adjusted for the value of tension desired in dead line 36 which is, of course, a known submultiple of the weight supported by travelling block 28, which is, in turn, inversely related to the drilling pressure. Once potentiometer 168 is set, the system continuously balances the position of wiper 76 against the adjustment of potentiometer 168 to produce a bridge balance.

The absolute position of wiper 76, irrespective of the setting of potentiometer 168, and, consequently, the tension in dead line 36, is continuously indicated on a meter 170. The meter 170 is connected between wiper 76 and terminal 146 through a fixed calibrating resistance 172 and a voltage divider comprising fixed resistor 184 and potentiometer 174. Potentiometer 174 is accessible on the panel of equipment 40 to initially calibrate the meter 170 to indicate as desired. As should be clear, the meter 170 may read directly in cable tension, or it may be calibrated to directly indicate bit pressure on the well bottom by so marking the meter face that an automatic subtraction of cable tension from total string weight is made.

The bridge 166 is energized from the 300 volt D.C. regulated supply which appears at terminals 144 and 146. A pair of condensers 176 and 178 are connected between the terminals for transient compensation and the common connection of these condensers is connected to ground terminal 124. The bridge circuit 166 is provided with a fuse 180 and a sensing relay coil 182 which comprises a part of a safety device to be described below.

The bridge output is applied through conductor 186 to a time delay network comprising resistor 188 and condenser 190. The time delay network or filter output is then applied through resistor 192 to a deviation meter circuit 194. Meter circuit 194 may be of any conventional type whereby meter movement 196 indicates the deviation of tension as indicated by wiper 76 from the predetermined tension selected by adjustment of potentiometer 168. In the instant embodiment a balanced D.C. amplifier comprising two triode sections 198 and 200 is employed. Each triode section has a respective plate resistor 202 and 204 and a respective cathode resistor 206 and 208. The triode sections have a common cathode resistor 210 which reduces the degenerative effect of cathode biasing and provides balanced operation. The grid of triode section 198 is connected to ground terminal 124 through a large grid resistor 212.

Thus, for example, if the meter 196 is adjusted to initially read zero, the center value of the meter, and a negative signal is subsequently applied to the grid of triode 200, conduction therethrough a diminished, reducing the current in resistor 210, making point 214 more negative, producing an effective positive bias on the grid of triode 198. Conduction through that triode section is therefore increased and the potential at point 216 becomes substantially positive relative to the potential at point 218. Current is thus produced in meter movement 196. If the grid signal on triode 200 became more negative, the meter 196 would indicate a deflection in the opposite direction. Initial balance of the two triode sections to produce zero current for zero tension deviation is controlled by potentiometer 220 and the maximum reading of meter 196 is controlled by potentiometer 222. The normal deviation in the drilling pressure permitted by this apparatus will be approximately 500 pounds under and 250 pounds over the preset optimum.

The time delay, averaging, or filter network, provided at the input to the meter circuit 194 is desirable to eliminate erratic indications due to excess freedom in the mechanical system, swinging movement of the flexible cables, short duration changes in strata, and other transient phenomena. It has been found that a period of approximately one second during which averaging of the deviation signal occurs is adequate to prevent erratic indications.

The averaged deviation signal from the first filter network is also applied to a second filter network comprising resistor 224 and condenser 226 and this signal is applied to the control grid of a pentode 228 comprising a single stage D.C. amplifier. Pentode 228 has its plate connected through plate resistor 230 to the 180 volt D.C. terminal 162 and has its cathode connected through fixed cathode resistor 232 and potentiometer 234 to ground terminal 124. For normal optimum drilling pressure, the plate connection 231 will be at about 75 volts. The output signal from amplifier 236 is applied through a resistive network 238 from connection 231 to the control grids of a pair of pentodes 240 and 242 which comprise an actuating circuit 244. The cathodes of tubes 240 and 242 are directly connected to the 75 volt D.C. terminal 164 and the screen grids are connected through resistors 246 and 248 to 180 volt terminal 162. The control grid of tube 240 is energized from the output of amplifier 236 through resistor 250 which forms a potentiometer circuit with one of a plurality of resistors 252 and resistor network 238. One of a plurality of resistors 252 [are] *is* connected through a connector switch 254 to 75 volt D.C. terminal 164 and thus the particular resistor 252 which is selected in combination with network 238 determines the grid bias on tube 240 and consequently the level of deviation at which the control tube 240 will be biased to cutoff. The control tube 240 will be conducting for all cable tensions within the desired range or in excess of the desired range, but will be nonconducting for tensions less than the range. Thus, for increased drilling pressures, wiper 76 will rise, producing a positive signal on the grid of tube 228, shifting point 231 to a more negative value, and if this shift reaches a predetermined value, the tube 240 will be biased to cutoff. The plate circuit of tube 240 includes a switch 256 and a relay coil 258. Switch 256 will remain closed whenever coil 182 in the bridge circuit is energized and thus for all normal operating conditions tube 240 will be conducting and coil 258 energized.

In the event that excessive drilling pressure is experienced, tube 240 will be cut off, relay coil 258 deenergized, and switches 260 and 262 will assume the positions illustrated. Switch 260 in the position illustrated energizes coil 264 which closes switch 266 to sound alarm horn 268. Alarm horn 268 is energized from terminal 128 through switch 266 to terminal 124, and coil 264 is energized from terminal 128 through switch 260 to ground terminal 124. Operation of switch 260 also deenergizes air dump valve 270 whereby no further cable may be payed out by the automatic device. The filaments of tubes *228* [236] and 240 are connected in series whereby failure of the amplifier tube *228* [236] will automatically sound the alarm.

The output of amplifier 236 is also applied to the control grid of tube 242 through the voltage divider comprising resistors 272 and 274 and grid resistor 276. The grid of tube 242 is normally maintained at cutoff potential by the appropriate selection of resistors 272 and 274 and conducts only upon the signal at the plate of amplifier pentode 228 rising to a predetermined value indicating a predetermined maximum of cable tension and consequently a minimum bit or drilling pressure. When this occurs, tube 242 conducts, energizing relay coil 278 which is in the plate circuit thereof. Energization of coil 278 operates switches 280 and 306 which are connected in a multivibrator circuit 282.

Multivibrator circuit 282 is a free-running cycling device in which triode section 284 is normally open and triode 286 is normally biased near the cutoff value. Tube 284 has a conventional cathode resistor 288, plate resistor 290, adjustable grid resistance 292, and coupling condenser 294. Triode 286 similarly has a plate resistance 296, a cathode resistance 298, a variable grid resistance 300 and a plate coupling condenser 302. Relay coil 304 is in series with plate resistance 296 of tube 286 and is connected to supply terminal 160. Plate resistor 290 is connected to terminal 160 through the switch 306 which is controlled by relay coil 278, and switch 280 is in series with coupling condenser 294 which is normally connected to 75 volt D.C. terminal 164. Thus, in the quiescent condition condenser 294 is charged positively and the plate voltage is removed from triode 284, while the triode 286 is biased near the cutoff value. When relay 278 is energized, switch 280 closes, connecting the charged condenser 294 to the plate resistor 290, and switch 306 closes, applying plate voltage to triode 284. This immediately produces conduction in tube 286 as condenser 294 charges and tube 284 is maintained at cutoff. Thus, relay 304 is energized, closing switch 308, which is in series with switch 262 and air valve solenoid 310.

A source of air pressure is indicated by broken line 312 which is connected through a regulator valve 311 to maintain a *regulator* [regular] tank 314 charged under pressure. Tank 314 is connected through a drying filter 316 to air valve 318. When solenoid 310 is energized, air pressure is applied through valve 318, through the lower differential valve 90, causing air cylinder 84 to be actuated, extending piston rod 82 and consequently brake handle 32. The multivibrator, at the end of its normal period, will switch, as determined by the adjustment of resistor *300* [30], and relay coil 304 will be deenergized to deenergize solenoid 310 and close air valve 318. Differential valve 90 will then be actuated as already described so that the air pressure in cylinder 84 is immediately relieved, whereby the brake will return to the "on" position. If, as a result of the short interval of cable payout the tension is reduced to produce the desired bit pressure, the circuit above described will become quiescent until the further indication of reduced bit pressure is received.

However, in the event that a single period of the multivibrator is inadequate to permit the necessary adjustment of the cable tension, and consequent bit pressure, the actuating circuit 244 will remain energized and the switches 280 and 306 will remain closed. In that event, a second predetermined period, the magnitude of which is controlled by variable resistor 292, must elapse before the multivibrator once again produces conduction in tube 286 and consequently produces additional payout of cable. This period is desirable in order to eliminate any transient effects due to the release of cable and to permit an accurate average indication of tension deviation to be sensed by the apparatus. It is desirable that the period during which tube 284 is conducting is at least as long as the time constant of the network comprising resistors 188 and 224 and condensers 190 and 226. Thus, the apparatus will have an opportunity to produce an average indication of bit pressure deviation from the optimum before additional correction is made.

Generally, a complete installation of the sensing and control equipment described herein may be completed in about two hours on an operating drilling rig. The operation is generally as follows: When the operator wishes to [added] *add* another length of pipe in the string, he disables the control circuits by opening switch 299. The pneumatic apparatus 42 is released from the brake handle 32 and placed on the drilling table, remaining attached at the base. The additional pipe length is positioned and the operator releases sufficient cable to provide the desired reading on meter 170. The pneumatic actuator 42 is reattached to the brake handle 32 and the deviation indicator 196 rebalanced by manipulation of potentiometer 168. The switch 299 is again closed and the automatic apparatus of this invention will assume control of the drilling operation. If it is desirable at any time to alter the bit pressure, potentiometer 168 may be adjusted accordingly and the system will automatically rebalance to the desired pressure.

While a system as described above includes particular components operated on direct current voltages, it will be obvious that many circuits may be devised which will include the essential functional features disclosed. Thus, an all A.C. system may be utilized in which either bridge impedances are employed for sensing dead-line tension or other devices, such as differential transformers, strain gauges, variable capacitances and the like may be used.

Systems utilizing combined A.C. and D.C. circuits may also be used. For example, a D.C. bridge may feed a chopper circuit followed by A.C. control apparatus. A conventional phase sensitive balanced discrimination may be employed with an A.C. system.

Furthermore, various indicators for total tension or bit pressure and deviation may be utilized provided only that the necessary averaging is produced to avoid erratic operation, excessive wear, and overcontrol or hunting. Also, although a multivibrator is herein proposed for releasing cable for predetermined time intervals followed by predetermined time intervals of quiescence, various techniques, such as commutator segments, delay relays, dash pots, and the like, might be employed to produce the necessary periodic response.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Apparatus for maintaining a predetermined drilling pressure on a well drilling tool which is supported from above by a flexible supporting cable comprising measuring means for continuously sensing the tension in said supporting cable, rotatably mounted reel means to receive said flexible cable, holding means having a locked position holding said reel means against rotation with said tool and supporting cable wound thereon and an unlocked position releasing the reel and permitting the gravitational descent of said supporting cable and drilling tool, cycling means operable to release said holding means to the unlocked position for a fixed interval of time and operable to return said holding means to the locked position for a fixed interval of time whereby said cable descends during said unlocked interval to reduce said tension by a predetermined increment, and means actuated by said measuring means for actuating said cycling means whenever said tension exceeds a predetermined maximum to reduce said tension by said predetermined increment provided said cycling means is not in said locked interval.

2. Apparatus for maintaining a predetermined drilling pressure on a well drilling tool which is supported from above by a flexible supporting cable comprising measuring means for continuously sensing the tension in said supporting cable and generating a signal corresponding thereto, rotatably mounted reel means to receive said flexible cable, holding means having a locked position holding said reel means against rotation with said supporting cable wound thereon and an unlocked position releasing the reel and permitting the gravitational descent of said tool and supporting cable, cycling means operable to release said holding means to the unlocked position for a fixed interval of time and operable to return said holding means to the locked position for a fixed interval of time whereby said cable descends during said unlocked interval to reduce said tension by a predetermined increment, and means responsive to the signal from said measuring means when said signal reaches a predetermined magnitude for actuating said cycling means whenever said tension exceeds a predetermined maximum to reduce said tension by said predetermined increment provided said cycling means is not in said locked interval.

3. Apparatus for maintaining a predetermined drilling pressure on a well drilling tool which is supported from above by a flexible supporting cable comprising measuring means for continuously sensing the tension in said supporting cable and generating a signal corresponding thereto, rotatably mounted reel means to receive said flexible cable, holding means having a locked position holding said reel means against rotation with said tool and supporting cable wound thereon and an unlocked position releasing the reel and permitting the gravitational descent of said supporting cable, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, signal averaging means energized by said measuring means, and control means responsive to the signal from said averaging means when said signal exceeds a predetermined magnitude for actuating said cycling means whenever said tension exceeds a predetermined maximum to reduce said tension by said predetermined increment.

4. Apparatus for maintaining a predetermined drilling pressure on a well drilling tool which is supported from above by a flexible supporting cable, a portion of which is wound about a rotatably mounted reel having holding means shiftable between a locked position holding said reel against rotation and an unlocked position releasing the reel and permitting the gravitational descent of said tool and supporting cable, said apparatus comprising measuring means continuously sensing the tension in said supporting cable and generating a signal corresponding thereto, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, signal averaging means energized by said measuring means, and control means responsive to the signal from said averaging means for actuating said cycling means whenever said tension exceeds a predetermined maximum to reduce said tension by said predetermined increment.

5. Apparatus for maintaining a predetermined drilling pressure on a well drilling tool which is supported from above by a flexible supporting cable, a portion of which is wound about a rotatably mounted reel having holding means shiftable between a locked position holding said reel against rotation and an unlocked position releasing the reel and permitting the gravitational descent of said tool and supporting cable, said apparatus comprising measuring means continuously sensing the tension in said supporting cable and generating an electric signal corresponding thereto, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, electric filter network means energized from said measuring means and providing a filtered output signal, and control means responsive to the signal from said filter network means for actuating said cycling means whenever said tension exceeds a predetermined maximum to reduce said tension by said predetermined increment.

6. Apparatus for maintaining a predetermined drilling pressure on a well drilling tool which is supported from above by a flexible supporting cable, a portion of which is wound about a rotatably mounted reel having holding means shiftable between a locked position holding said reel against rotation and an unlocked position releasing the reel and permitting the gravitational descent of said tool and supporting cable, said apparatus comprising measuring means continuously sensing the tension in said supporting cable and generating an electric signal corresponding thereto, resilient means normally maintaining said holding means in the locked position, fluid actuated means to actuate said holding means to the unlocked position, cycling means for controlling said fluid actuated means for a fixed interval of time to unlock the holding means whereby said cable descends during said unlocked interval to reduce said tension by a predetermined increment, electric filter network means energized from said measuring means and providing a filtered output signal, and control means responsive to the signal from said filter network means for actuating said cycling means whenever said tension exceeds a predetermined maximum to reduce said tension by said predetermined increment, said cycling means including means to prevent the actuation of said fluid actuated means for a predetermined interval following said fixed interval.

7. The apparatus recited in claim 6 wherein said cycling means is a monostable multivibrator operating said fluid actuated means when in the unstable period.

8. The apparatus of claim 6 wherein said measuring means is a bridge circuit, one leg of which is a variable impedance, the magnitude of which corresponds to the tension in said cable, the output of said bridge being applied to said filter network means.

9. The apparatus of claim 6 wherein the holding means comprises a manually operable brake handle disposed above a platform and said [ffuid] *fluid* actuated means is secured between said brake handle and said platform.

10. The apparatus of claim 9 wherein said fluid actuated means is removably connected to said handle by a quickly detachable latch mechanism.

11. The apparatus of claim 9 wherein said fluid actuated means includes valve means responsive to pressure on said brake handle to permit manual operation of said brake handle irrespective of the condition of said cycling means.

12. Apparatus for maintaining a predetermined drilling pressure on a well drilling tool which is supported from above by a flexible supporting cable, a portion of which is wound about a rotatably mounted reel having holding means shiftable between a locked position holding said reel against rotation and an unlocked position releasing the reel and permitting the gravitational descent of said tool and supporting cable, said apparatus comprising measuring means continuously sensing the tension in said supporting cable and generating an electric signal corresponding thereto, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, signal averaging means energized by said measuring means, control means responsive to a signal from said averaging means for actuating said cycling means whenever said tension exceeds a predetermined maximum to reduce said tension by said predetermined increment, and indicating means to continuously indicate the average deviation of said tension from said predetermined maximum.

13. Apparatus for maintaining a predetermined drilling pressure on a well drilling tool which is supported from above by a flexible supporting cable, a portion of which is wound about a rotatably mounted reel having holding means shiftable between a locked position holding said reel against rotation and an unlocked position releasing the reel and permitting the gravitational descent of said tool and supporting cable, said apparatus comprising measuring means continuously sensing the tension in said supporting cable and generating an electric signal corresponding thereto, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, signal averaging means energized by said measuring means, control means responsive to a signal from said averaging means for actuating said cycling means whenever said tension exceeds a predetermined maximum to reduce said tension by said predetermined increment, meter means to continuously indicate said tension, and indicating means to continuously indicate the average deviation of said tension from said predetermined maximum.

14. Apparatus for maintaining a predetermined drilling pressure on a well drilling tool which is supported from above by a flexible supporting cable, a portion of which is wound about a rotatably mounted reel having holding means shiftable between a locked position holding said [heel] *reel* against rotation and an unlocked position releasing the reel and permitting the gravitational descent of said tool and supporting cable, said apparatus comprising measuring means continuously sensing the tension in said supporting cable and generating an electric signal corresponding thereto, resilient means normally maintaining said holding means in the locked position, cycling means releasing said holding means to the unlocked position for a fixed interval of time and returning said holding means to the locked position for a fixed interval of time whereby said cable descends during said unlocked interval to reduce said tension by a predetermined increment, signal averaging means energized by said measuring means, control means responsive to the signal from said averaging means for actuating said cycling means whenever said tension exceeds a predetermined maximum to reduce said tension by said predetermined increment, meter means to continuously indicate said tension, alarm means responsive to said control means to indicate whenever said force exceeds predetermined value, and indicating means to continuously indicate the average deviation of said tension from said predetermined value.

15. An actuator for use with automatic apparatus for maintaining a predetermined drilling pressure on a well drilling tool which is supported from above by a flexible supporting cable, a portion of said cable being wound about a reel rotatably mounted on a platform and having a brake holding said reel against rotation and a manually actuatable brake handle extending therefrom in spaced relationship with said platform, said actuator comprising a fluid cylinder, means connecting said cylinder in fluid communication with said automatic apparatus, quickly disconnectable latch means securing said cylinder to said platform, extensible piston means axially movable in said cylinder in response to fluid pressure therein, quickly disconnectable means connecting said piston means to the handle, and means urging said piston means in a direction opposing the pressure actuated axial movement of said piston means to urge said brake handle into locking position.

16. Apparatus for maintaining a predetermined drilling pressure on a well drilling tool which is supported from above by a supporting member comprising measuring means for continuously sensing the tension in said supporting member, supporting member feeding means having a locked position holding said supporting member against descent and an unlocked position permitting the descent of said tool and supporting member, cycling means responsive to said measuring means whenever said tension exceeds a predetermined maximum operable to release said feeding means to the unlocked position for a fixed period of time and operable to return said feeding means to the locked position for a fixed interval of time whereby said supporting member descends during said unlocked interval to reduce said tension by a predetermined increment.

17. Apparatus for maintaining a predetermined drilling pressure on a well drilling tool which is supported from above by a flexible supporting cable comprising measuring means for continuously sensing the tension in said supporting cable, cable feeding means having a locked position holding said supporting cable against descent and an unlocked position permitting the descent of said tool and supporting cable, cycling means operable to release said feeding means to the unlocked position for a fixed interval of time and operable to return said feeding means to the locked position for a fixed interval of time, whereby said cable descends during said unlocked interval to reduce said tension by a predetermined increment, and means actuated by said measuring means for actuating said cycling means whenever said tension exceeds a predetermined maximum to reduce said tension by said predetermined increment provided said cycling means is not in said locked interval.

*18. Apparatus for maintaining a predetermined pressure on a well drilling tool which is supported from above by a supporting member comprising measuring means for sensing the tension in said supporting member, supporting member holding means having a holding position holding said supporting member against descent and a position permitting the descent of said tool and supporting member, release means responsive to said measuring means whenever said tension exceeds a predetermined maximum operable to release said holding means permitting the descent of said tool and supporting member, deactuating means continuously opposing said release means and urging said holding means to the holding position, said release means overriding said deactuating means*

*whenever said tension exceeds said predetermined maximum to release said holding means, and return means initiated by operation of said release means and a predetermined interval of supporting member release to return said holding means to the holding position irrespective of the magnitude of the tension sensed by said measuring means.*

*19. Apparatus for maintaining a predetermined drilling pressure on a well drilling tool which is supported from above by a supporting member comprising measuring means for continuously sensing the tension in said supporting member, supporting member holding means having a locked position holding said supporting member against descent and an unlocked position permitting the descent of said tool and supporting member, release means responsive to said measuring means whenever said tension exceeds a predetermined maximum operable to release said holding means to the unlocked position, and return means initiated by operation of said release means and the release of said supporting member for a predetermined interval to return said holding means to the locked position and maintain said holding means in the locked position for a short predetermined interval irrespective of the magnitude of the tension sensed by said measuring means.*

*20. Apparatus for maintaining a predetermined drilling pressure on a well drilling tool which is supported from above by a supporting member comprising measuring means for continuously sensing the tension in said supporting member, supporting member holding means having a locked position holding said supporting member against descent and an unlocked position permitting the descent of said tool and supporting member, release means responsive to said measuring means whenever said tension exceeds a predetermined maximum operable to release said holding means to the unlocked position, and return means initiated a predetermined interval following operation of said release means to return said holding means to the locked position and maintain said holding means in the locked position for a predetermined interval irrespective of the magnitude of the tension sensed by said measuring means.*

*21. Automatic control apparatus for maintaining a predetermined drilling pressure on a well drilling tool which is supported from above by a flexible cable comprising tension means sensing the tension in said supporting cable, reel means receiving said cable and adapted to feed said cable for lowering said drilling tool, brake means on said reel having a locked position holding said reel against rotation and an unlocked position permitting said reel to rotate and said tool to descend, release means responsive to said tension means whenever said tension exceeds a predetermined maximum operable to release said brake to the unlocked position, and return means initiated by operation of said release means for a short interval to return said brake to the locked position for a short interval irrespective of the magnitude of the tension sensed by said tension means.*

References Cited in the file of this patent
or the original patent

UNITED STATES PATENTS

| | | |
|---|---|---|
| 1,779,656 | Brauer | Oct. 28, 1930 |
| 1,919,611 | Besigk | July 25, 1933 |
| 1,926,119 | Smith | Sept 12, 1933 |
| 2,126,189 | Goldman | Aug. 9, 1938 |
| 2,274,339 | Loomis | Feb. 24, 1942 |
| 2,609,181 | Jaeschke | Sept. 2, 1952 |
| 2,688,871 | Lubinski | Sept. 14, 1954 |